US012687763B2

(12) United States Patent
Suzuki et al.

(10) Patent No.: US 12,687,763 B2
(45) Date of Patent: Jul. 21, 2026

(54) OPTICAL ELEMENT DRIVING DEVICE, CAMERA MODULE, AND CAMERA-MOUNTED DEVICE

(71) Applicants: Shun Suzuki, Tokyo (JP); Tomohiko Osaka, Tokyo (JP)

(72) Inventors: Shun Suzuki, Tokyo (JP); Tomohiko Osaka, Tokyo (JP)

(73) Assignee: Mitsumi Electric Co., Ltd., Tokyo (JP)

(*) Notice: Subject to any disclaimer, the term of this patent is extended or adjusted under 35 U.S.C. 154(b) by 296 days.

(21) Appl. No.: 18/229,770

(22) Filed: Aug. 3, 2023

(65) Prior Publication Data

US 2024/0045311 A1     Feb. 8, 2024

(30) Foreign Application Priority Data

Aug. 5, 2022     (JP) ................................. 2022-125641

(51) Int. Cl.
*G03B 13/36*          (2021.01)
*G02B 7/09*           (2021.01)

(52) U.S. Cl.
CPC .............. *G03B 13/36* (2013.01); *G02B 7/09* (2013.01)

(58) Field of Classification Search
CPC ... G02B 7/04; G02B 7/08; G02B 7/09; G02B 13/009; G03B 3/10; G03B 3/12; G03B 13/32; G03B 13/34; G03B 13/36
USPC ........................................................ 396/144
See application file for complete search history.

(56) References Cited

U.S. PATENT DOCUMENTS

| | | | |
|---|---|---|---|
| 2021/0173175 A1* | 6/2021 | Itagaki ................. | G02B 27/646 |
| 2022/0308303 A1 | 9/2022 | Suzuki et al. | |
| 2023/0016060 A1 | 1/2023 | Sugawara | |
| 2023/0185170 A1* | 6/2023 | Suzuki ..................... | G03B 3/10 |
| | | | 348/207.99 |

FOREIGN PATENT DOCUMENTS

| | | |
|---|---|---|
| JP | 2020-013065 | 1/2020 |
| JP | 2020-201359 | 12/2020 |
| JP | 2021-092726 | 6/2021 |

(Continued)

OTHER PUBLICATIONS

Notification of Office Action Dated Nov. 7, 2025 From The State Intellectual Property Office of the People's Republic of China Re. Application No. 202310971910.3 and Its Translation Into English. (16 Pages).

(Continued)

*Primary Examiner* — Marin Pichler

(57)     ABSTRACT

An optical element driving device includes: a holding part configured to hold an optical element; a housing part configured to house the holding part such that the holding part is movable in an optical path direction of the optical element; a driving part including a piezoelectric element configured to drive the holding part; an inductor configured to increase an input voltage to the piezoelectric element; and a position sensor configured to acquire a relative position of the holding part and the housing part in the optical path direction by detecting a magnetic force of a magnet. In regions defined by dividing the holding part and the housing part into equal quarters around an optical axis, the driving part and the position sensor are disposed in a same region, and the inductor is disposed in a region different from the same region.

6 Claims, 10 Drawing Sheets

(56) References Cited

FOREIGN PATENT DOCUMENTS

| | | | |
|---|---|---|---|
| WO | WO 2021/210365 | 10/2021 | |
| WO | WO-2021210365 A1 * | 10/2021 | ............. H04N 23/50 |

OTHER PUBLICATIONS

Notification of Office Action Dated Feb. 4, 2026 From the National Intellectual Property Administration of the People's Republic of China Re. Application No. 202310971910.3 and Its Translation Into English. (17 Pages).

* cited by examiner

M

M

OPTICAL ELEMENT DRIVING DEVICE, CAMERA MODULE, AND CAMERA-MOUNTED DEVICE

CROSS REFERENCE TO RELATED APPLICATIONS

This application claims the benefit of priority of Japanese Patent Application No. 2022-125641, filed on Aug. 5, 2022, the contents of which are incorporated by reference as if fully set forth herein in their entirety.

TECHNICAL FIELD

The present invention relates to an optical element driving device that drives optical elements, a camera module and a camera-mounted device.

BACKGROUND ART

In general, a camera module is mounted in a camera-mounted device such as a smartphone and a drone. In such a camera module, an optical element driving device that drives optical elements is used. Note that a drone is an unmanned aircraft that can be flown by remote control or automatic control, and is also called a multicopter.

An optical element driving device has an auto focus function (hereinafter referred to as "AF function", AF: Auto Focus). With the AF function, the optical element driving device automatically performs focusing for capturing the subject by moving the lens in the optical axis direction.

As such an optical element driving device, for example, PTL 1 discloses a lens driving device including an actuator including a piezoelectric element for driving a lens in the optical axis direction, and a substrate including a circuit for controlling the voltage application to the piezoelectric element. In PTL 1, the substrate also includes a magnetic sensor for detecting the position of the lens position.

CITATION LIST

Patent Literature

PTL 1
Japanese Patent Application Laid-Open No. 2020-13065

SUMMARY OF INVENTION

Technical Problem

In the lens driving device disclosed in PTL 1, an actuator including a piezoelectric element is used as the lens driving source. It is considered to use as the actuator an ultrasound motor that can obtain a large thrust.

A relatively large drive voltage is required for driving the ultrasound motor; however, the input voltage from the power source is relatively small in a small-sized, thin camera-mounted device. Therefore, in a circuit for controlling the voltage application to the piezoelectric element, the input voltage is increased by using an inductor, and supplied to the ultrasound motor.

In this manner, the inductor can increase the input voltage; however, since the coil is provided, there is the leakage flux from the coil. As described above, the lens driving device includes the magnetic sensor for detecting the position of the lens, and therefore the detection accuracy for the lens position may possibly be reduced under the influence of the leakage flux from the coil of the inductor. Therefore, there is a demand for a lens driving device that can prevent the reduction of the detection accuracy of the lens position.

An object of the present invention is to provide an optical element driving device, a camera module and a camera-mounted device that can prevent reduction in accuracy of the position detection of the optical element.

Solution to Problem

To achieve the above-mentioned object, an optical element driving device according to the present invention includes: a holding part configured to hold an optical element; a housing part configured to house the holding part such that the holding part is movable in an optical path direction of the optical element; a driving part including a piezoelectric element configured to drive the holding part; an inductor configured to increase an input voltage to the piezoelectric element; and a position sensor configured to acquire a relative position of the holding part and the housing part in the optical path direction by detecting a magnetic force of a magnet, wherein in regions defined by dividing the holding part and the housing part into equal quarters around an optical axis, the driving part and the position sensor are disposed in a same region, and the inductor is disposed in a region different from the same region.

To achieve the above-mentioned object, a camera module according to the present invention includes: the optical element driving device; and an image capturing part configured to capture a subject image by using the optical element.

To achieve the above-mentioned object, a camera-mounted device according to the present invention is an information device or a transport device, the camera-mounted device including: the camera module; and an image processing part configured to process image information obtained by the camera module.

Advantageous Effects of Invention

According to the present invention, reduction in accuracy of the position detection of the optical element can be prevented.

DESCRIPTION OF EMBODIMENTS

An embodiment of the present invention is elaborated below with reference to the accompanying drawings.

Smartphone

Figure 1A:
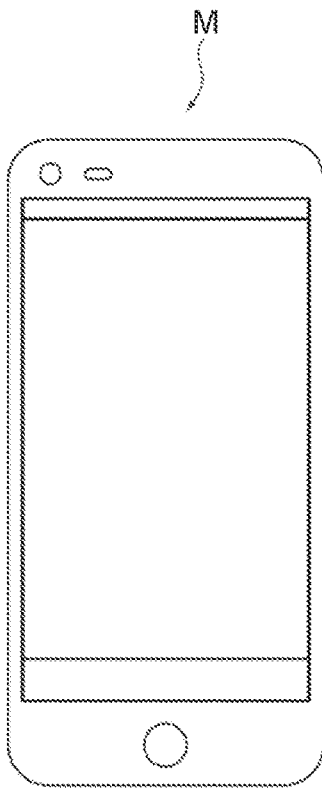
FIG. 1A is a front view illustrating a smartphone equipped with a camera module according to an embodiment of the present invention.
Figure 1B:
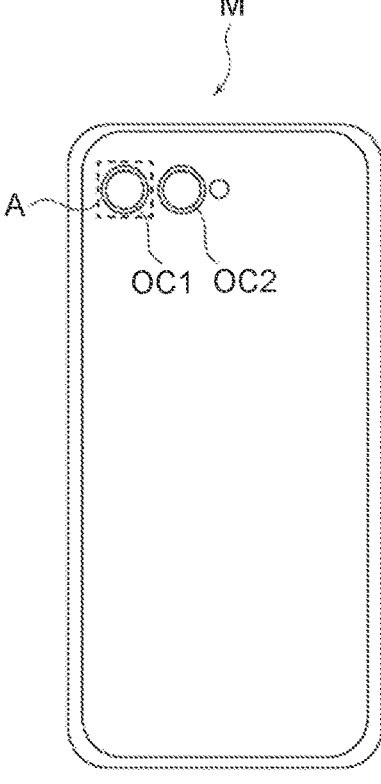
FIG. 1B is a rear view of the smartphone illustrated in FIG. 1A.

FIGS. 1A and 1B illustrate smartphone M (an example of the camera-mounted device) equipped with camera module A according to the present embodiment. FIG. 1A is a front view of smartphone M, and FIG. 1B is a rear view of smartphone M.

Smartphone M includes a dual camera comprising two back surface cameras OC1 and OC2. In the present embodiment, camera module A is applied to back surface cameras OC1 and OC2.

Camera module A has an AF function, and can automatically perform focusing when capturing the subject. Note that camera module A may include a shake correction function (hereinafter referred to as "OIS function", OIS: Optical Image Stabilization). With the OIS function, images with no image blurring can be captured by optically correcting the runout (vibration) that is caused upon capturing an image.

Camera Module

Figure 2:
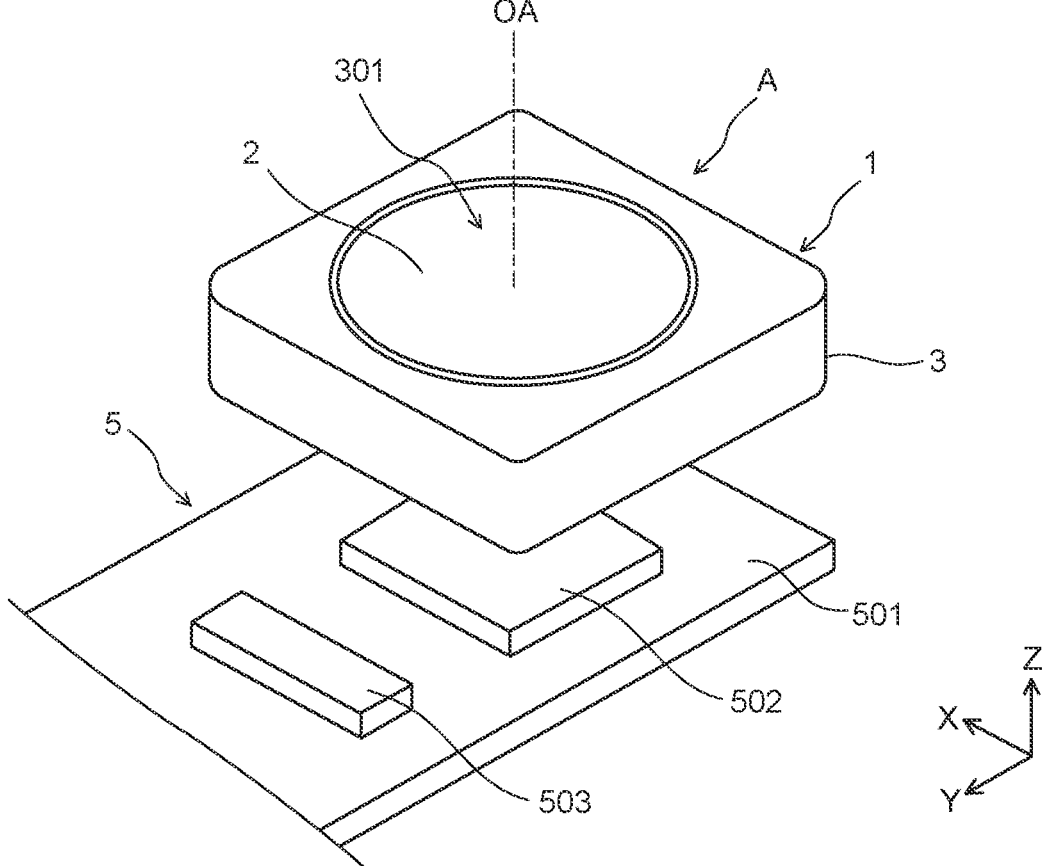
FIG. 2 is a perspective view illustrating a camera module and an image-capturing part.
Figure 3:
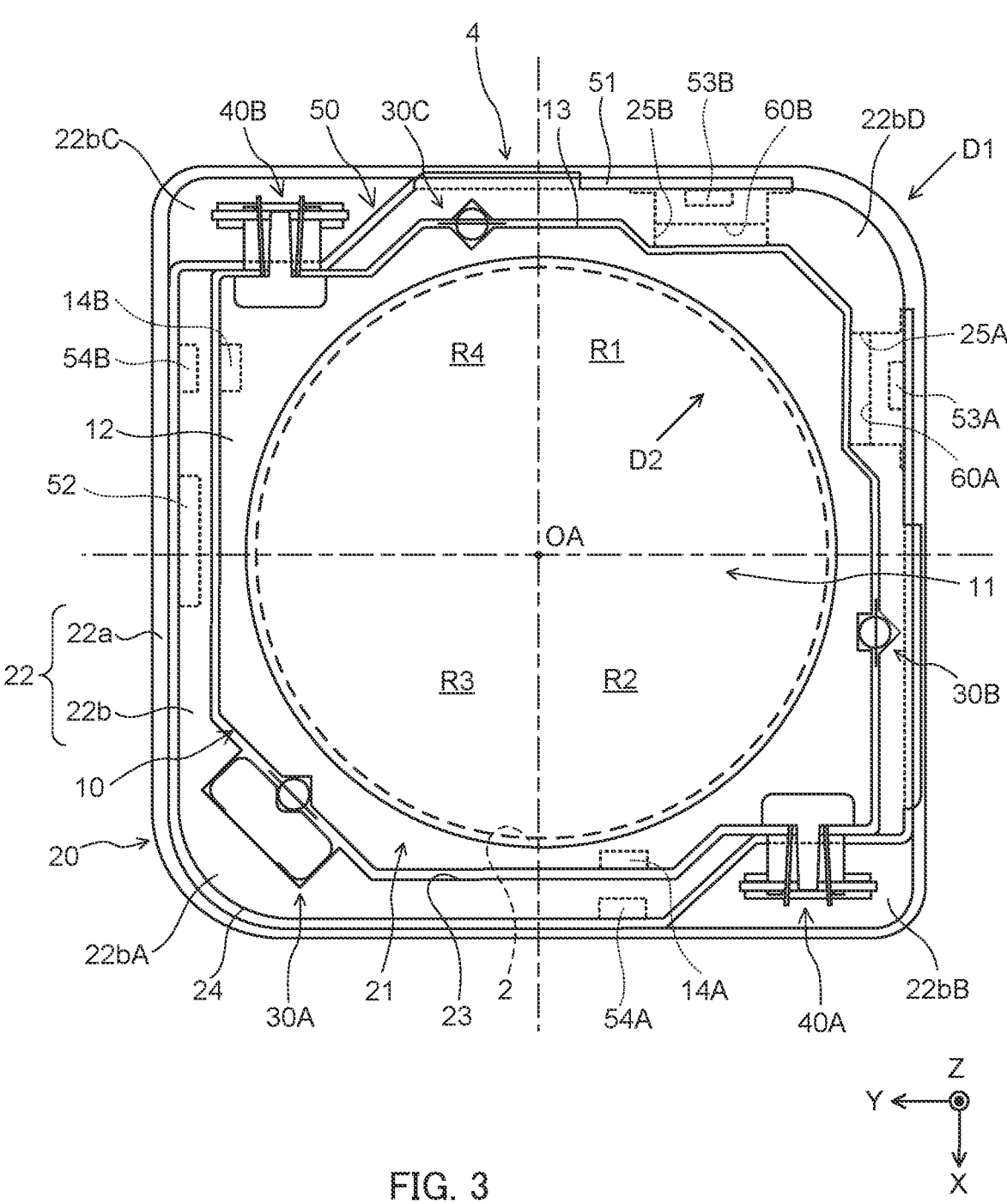
FIG. 3 is a plan view of an optical element driving device body provided in an optical element driving device of the camera module.

FIG. 2 is a perspective view illustrating camera module A and image-capturing part 5. FIG. 3 is a plan view of optical element driving device body 4 provided in optical element driving device 1 of camera module A illustrated in FIG. 2. As illustrated in FIGS. 2 and 3, the present embodiment is described using the orthogonal coordinate system (X, Y, Z). In addition, the drawings described later are also described using the orthogonal coordinate system (X, Y, Z).

Camera module A is mounted such that when an image is captured with smartphone M, the X direction is the up-down direction (or left-right direction), the Y direction is the left-right direction (or up-down direction), and the Z direction is the front-rear direction, for example. Specifically, the Z direction is the optical axis direction of optical axis OA of lens part 2 illustrated in FIG. 2, the upper side (+Z side) in FIG. 2 is the light reception side of the optical axis direction and the lower side (−Z side) in FIG. 2 is the imaging side of the optical axis direction.

Note that in the following description, while the description will be made using optical axis OA, the optical axis direction of optical axis OA may be referred to as optical path direction, or focusing direction (direction of adjusting the focal point) in accordance with the type of the optical element. Here, the optical path is the optical route formed by opening 301 of cover 3 described later, opening 11 of holding part 10 described later, or housing opening 21 of housing part 20 described later, and the extending direction of the optical path (the extending direction of each opening) is the optical path direction.

As illustrated in FIGS. 2 and 3, camera module A includes optical element driving device 1 that achieves the AF function, lens part 2 with a lens housed in a cylindrical lens barrel, image-capturing part 5 that captures a subject image formed by lens part 2, and the like. Specifically, optical element driving device 1 is a so-called lens driving device that drives lens part 2 as an optical element.

Optical element driving device 1 of the present embodiment is configured such that the length in the Z direction is smaller than the length in the X direction and the Y direction in consideration of mounting to the above-described camera module A and the like, and configured to have a reduced height when the Z direction is set as the height direction.

Cover

In optical element driving device 1, the outside of optical element driving device body 4 is covered with cover 3. Cover 3 is a capped quadrangular cylindrical member with a substantially rectangular shape in plan view as viewed from the Z direction. In the present embodiment, cover 3 has a substantially square shape in plan view. Cover 3 includes substantially semicircular opening 301 in a top surface. Lens part 2 is configured to be housed in opening 11 of holding part 10 of optical element driving device body 4, so as to face outside from opening 301 of cover 3 and protrude to the light reception side than the opening surface of cover 3 along with the movement in the Z direction. The inner wall of cover 3 is fixed by bonding to housing part 20 (bottom part 22*a*) of optical element driving device body 4, and houses optical element driving device body 4, for example.

Cover 3 includes a member, such as a shielding member comprising a magnetic substance, that blocks the electromagnetic waves from the outside of optical element driving device 1 and/or the inside of cover 3.

Image-Capturing Part

Image-capturing part 5 is disposed on the imaging side of optical element driving device 1. Image-capturing part 5 includes image sensor substrate 501, and imaging element 502 and control part 503 mounted on image sensor substrate 501, for example. Imaging element 502 comprises a CCD (charge-coupled device) image sensor, a CMOS (complementary metal oxide semiconductor) image sensor or the like, and captures a subject image formed by lens part 2, for example.

Control part 503 comprises a control IC, and drives and controls the entirety of optical element driving device 1, for example. Optical element driving device 1 is mounted to image sensor substrate 501 and mechanically and electrically connected. Control part 503 may be provided in image sensor substrate 501, or in a camera-mounted device equipped with camera module A (in the present embodiment, smartphone M).

Note that in FIG. 2, the subject image is formed on imaging element 502 by driving lens part 2 in the Z direction by optical element driving device 1 with respect to image sensor substrate 501 whose position is fixed, but imaging element 502 may be driven in the Z direction, for example. In this case, it suffices to form a subject image on imaging element 502 by driving imaging element 502, which is an optical element, in the Z direction by optical element driving device 1 with lens part 2 fixed to cover 3.

Optical Element Driving Device Body

Optical element driving device body 4 is a body portion of optical element driving device 1 that drives lens part 2, which is an optical element, in the Z direction. Note that the following description assumes that optical element driving device 1 drives lens part 2 for convenience of description, but optical element driving device 1 may drive imaging element 502 as described above.

As illustrated in FIG. 3, optical element driving device body 4 includes holding part 10, housing part 20, first supporting part 30A, second supporting part 30B, third supporting part 30C, driving parts 40A and 40B (the first driving part and the second driving part in the present invention), substrate part 50 and the like.

Holding Part

Holding part 10 includes frame part 12 with opening 11 formed at a center portion, and opening 11 is configured to be able to hold lens part 2 inside. For example, opening 11 is configured with an attaching groove or the like formed at its inner peripheral surface so as to be able to hold lens part 2 at the inner peripheral surface. In this manner, holding part 10 holds lens part 2 by surrounding the outer periphery of lens part 2.

A plurality of portions (e.g., three portions in FIG. 3) in outer peripheral surface 13, which is the outer periphery side of frame part 12, is supported in a movable manner in the Z direction by first supporting part 30A, second supporting part 30B, and third supporting part 30C extending along the Z direction.

In addition, a plurality of portions (e.g., two portions in FIG. 3) in outer peripheral surface 13 is held by driving parts 40A and 40B, and holding part 10 is movable in the Z direction by driving parts 40A and 40B.

In addition, outer peripheral surface 13 is provided with magnets 14A and 14B for detecting the Z direction position at a plurality of portions (e.g., two portions in FIG. 3) thereof. Position detection sensors 54A and 54B (the position sensor in the present invention) described later are provided to face magnets 14A and 14B, respectively.

Note that opening 11 is formed in a cylindrical shape to match the cylindrical shape of lens part 2, but its shape may be changed to an appropriate shape in accordance with the shape of lens part 2.

In addition, in the case where optical element driving device 1 drives imaging element 502, holding part 10 may not be provided with opening 11, that is, holding part 10 may not be a frame part. In this case, for example, it suffices to hold imaging element 502 at the top surface (light reception side surface) of holding part 10.

Housing Part

Housing part 20 includes frame part 22 provided with housing opening 21 formed at a center portion, and housing opening 21 is configured to be able to house holding part 10 inside so as to surround the outer periphery of holding part 10.

First supporting part 30A, second supporting part 30B, and third supporting part 30C are provided at a plurality of portions in inner peripheral surface 23 inside housing opening 21. With first supporting part 30A, second supporting part 30B, and third supporting part 30C, housing part 20 supports holding part 10 in a movable manner in the Z direction.

In addition, driving parts 40A and 40B are provided at a plurality of portions in inner peripheral surface 23. Driving parts 40A and 40B provided in housing part 20 move holding part 10 in the Z direction. Holding part 10 functions as a movable part driven by driving parts 40A and 40B, and housing part 20 functions as a fixed part with respect to holding part 10.

In plan view, inner peripheral surface 23 is formed to match the shape of outer peripheral surface 13 of holding part 10. In FIG. 3, the shapes of outer peripheral surface 13 of holding part 10 and inner peripheral surface 23 of housing opening 21 are examples, and may be changed as necessary in accordance with the arrangement of first supporting part 30A, second supporting part 30B, third supporting part 30C, driving parts 40A and 40B and the like, for example.

Frame part 22 includes bottom part 22a and side wall part 22b. The above-described inner wall of cover 3 is fixed by bonding to bottom part 22a, for example. Substrate part 50 is attached to and along outer peripheral surface 24, which is the outer periphery of side wall part 22b.

Supporting Part

First supporting part 30A, second supporting part 30B, and third supporting part 30C are interposed between outer peripheral surface 13 of holding part 10 and inner peripheral surface 23 of housing part 20, and support holding part 10 in a movable manner in the Z direction with respect to housing part 20. As illustrated in FIG. 3, first supporting part 30A, second supporting part 30B, and third supporting part 30C are disposed in inner peripheral surface 23 (outer peripheral surface 13) at a three portions separated from one another in the circumferential direction.

Figure 4:
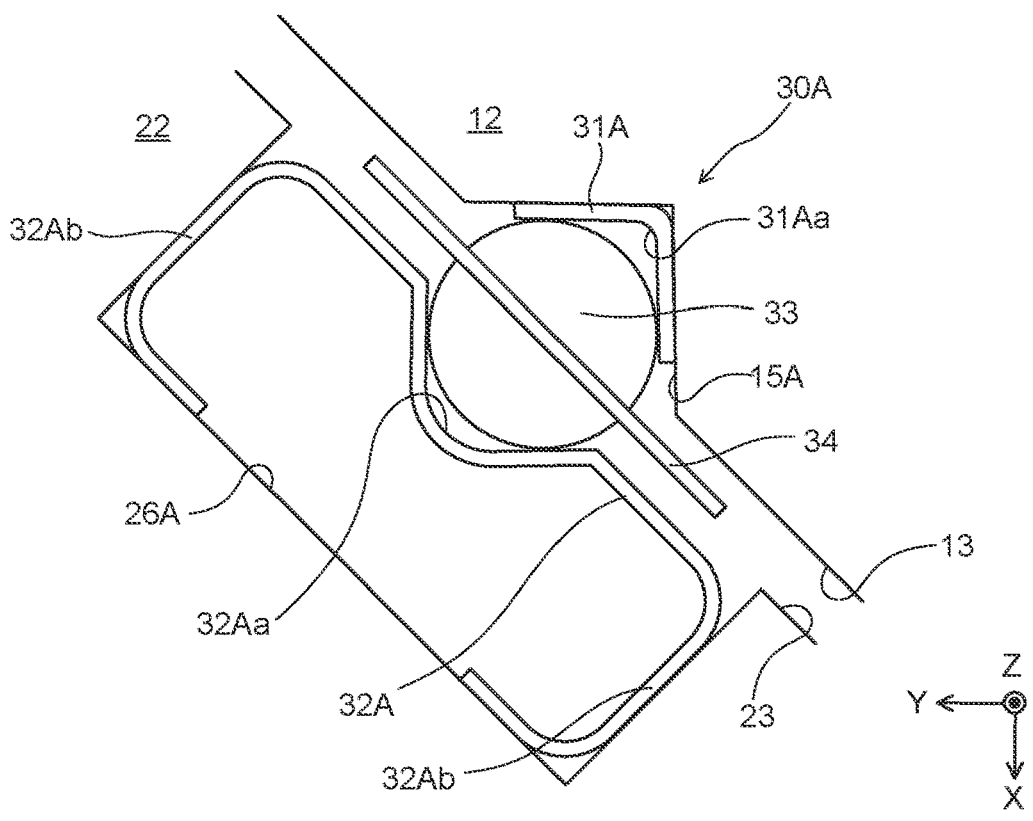
FIG. 4 is an enlarged view illustrating a first supporting part of the optical element driving device body illustrated in FIG. 3.
Figure 5:
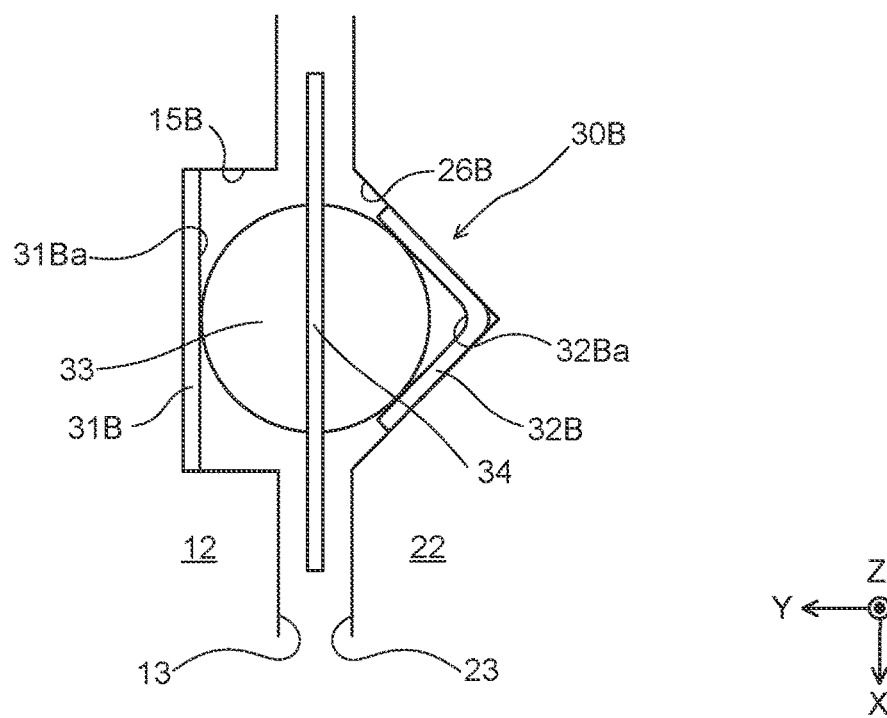
FIG. 5 is an enlarged view illustrating a second supporting part of the optical element driving device body illustrated in FIG. 3.
Figure 6:
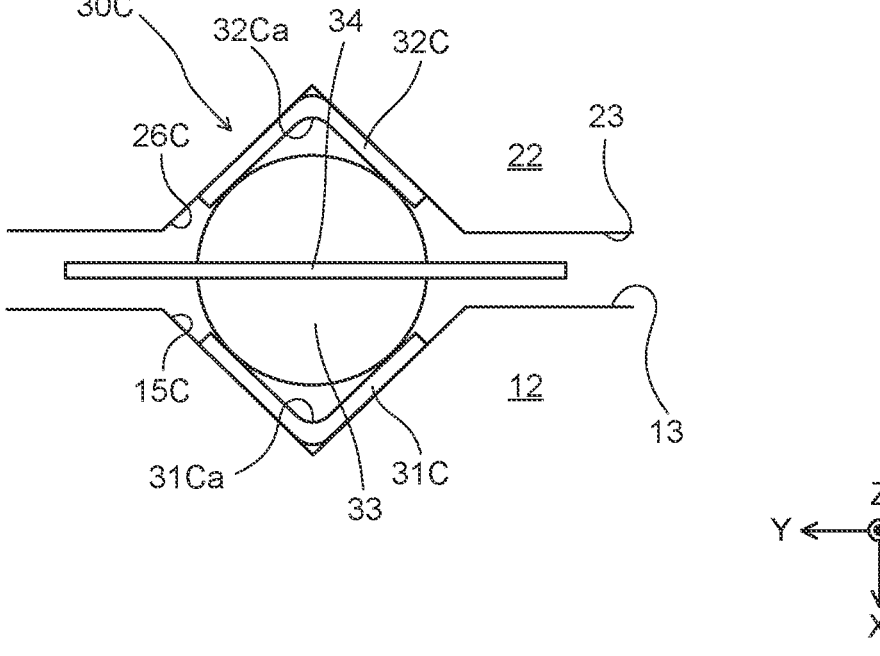
FIG. 6 is an enlarged view illustrating a third supporting part of the optical element driving device body illustrated in FIG. 3.

First supporting part 30A, second supporting part 30B and third supporting part 30C are described below with reference to FIGS. 4 to 6. FIG. 4 is an enlarged plan view illustrating first supporting part 30A of optical element driving device body 4 illustrated in FIG. 3. FIG. 5 is an enlarged plan view illustrating second supporting part 30B of optical element driving device body 4 illustrated in FIG. 3. FIG. 6 is an enlarged plan view illustrating third supporting part 30C of optical element driving device body 4 illustrated in FIG. 3.

First Supporting Part

As illustrated in FIG. 3, housing part 20 includes four corner portions 22bA, 22bB, 22bC and 22bD. As described later, first supporting part 30A includes second rail member 32A functioning as a biasing member, and requires an installation space. Therefore, first supporting part 30A is disposed at corner portion 22bA, which is one of four corner portions 22bA, 22bB, 22bC and 22bD. With this arrangement, space-saving of the device can be achieved, the reduction of the entire device can be achieved, and cost reduction can be achieved.

As illustrated in FIG. 4, first supporting part 30A includes first groove part 15A, recess 26A, first rail member 31A, and second rail member 32A, and further includes rolling member 33 (e.g., a ball member and the like), and retainer 34.

First groove part 15A is a groove formed to be recessed in a V-shape and provided to extend in the Z direction at outer peripheral surface 13 of frame part 12 of holding part 10. Recess 26A is a groove formed in a recessed shape provided to extend in the Z direction at inner peripheral surface 23 of frame part 22 of housing part 20. First groove part 15A and recess 26A are disposed to face each other. Recess 26A is formed in a size that can accommodate second rail member 32A functioning as a biasing member.

First rail member 31A is a V-shaped cross-sectional member extending in the longitudinal direction that is the Z direction at the time of attaching. First rail member 31A includes V-shaped guide groove 31Aa on the side on which rolling member 33 is disposed in a rollable manner, and is attached to first groove part 15A on the side opposite to that side.

In plan view, second rail member 32A is a member extending in the longitudinal direction that is the Z direction at the time of attaching and includes V-shaped guide groove 32Aa, and two arm parts 32Ab disposed at both ends of guide groove 32Aa. Rolling member 33 is disposed in a rollable manner at guide groove 32Aa. In plan view, two arm parts 32Ab are each formed in a U-shape, and are disposed such that the opening portions of the U-shapes face each other. Such two arm parts 32Ab are attached in contact with the inner wall of recess 26A.

Second rail member 32A is formed of elastically-deformable material such as metal so as to function as a leaf spring, and is supported in an elastically-deformable manner at the inner wall of recess 26A through two arm parts 32Ab.

First rail member 31A is attached to first groove part 15A and second rail member 32A is attached to recess 26A, and thus, they are disposed such that guide groove 31Aa and guide groove 32Aa thereof face each other.

A plurality of (e.g., two) rolling members 33 is housed and sandwiched in a rollable manner between guide groove 31Aa of first rail member 31A and guide groove 32Aa of second rail member 32A disposed in the above-mentioned manner. The plurality of rolling members 33 is rolled along guide groove 31Aa and guide groove 32Aa, and guided in the Z direction.

Retainer 34 includes holding holes corresponding to the number of rolling members 33. The plurality of rolling members 33 is held in a rollable manner in respective holding holes, and disposed along the Z direction. With retainer 34, the distance between the plurality of rolling members 33 is kept constant.

Accordingly, the biasing force associated with elastic deformation of second rail member 32A functioning as a biasing member presses first rail member 31A and first groove part 15A through rolling member 33, and applies a pressing force to holding part 10.

In this manner, by using second rail member 32A functioning as a biasing member, first supporting part 30A applies to holding part 10 a pressing force toward the inside of opening 11 through rolling member 33. In this manner, first supporting part 30A supports holding part 10 in a movable manner in the Z direction while pressing holding part 10 in the direction toward the inside of opening 11, and thus the tilting of holding part 10 can be suppressed. As a result, housing part 20 can stably support holding part 10 through first supporting part 30A.

In this case, by forming first rail member 31A with a metal material or the like harder than holding part 10, first groove part 15A is less deformed even when a pressing force is received from rolling member 33. With this configuration, first supporting part 30A can stably support holding part 10 in a movable manner in the Z direction.

Second Supporting Part

Unlike the above-mentioned first supporting part 30A, second supporting part 30B does not include a component such as second rail member 32A functioning as a biasing member, and therefore does not require the installation space in comparison with first supporting part 30A. Thus, second supporting part 30B can be disposed at the side between corner portion 22bD and corner portion 22bB by avoiding four corner portions 22bA, 22bB, 22bC and 22bD. In this manner, second supporting part 30B can be disposed by avoiding four corner portions 22bA, 22bB, 22bC and 22bD, and thus driving parts 40A and 40B can be disposed at corner portions 22bB and 22bC.

As illustrated in FIG. 5, second supporting part 30B includes first groove part 15B, second groove part 26B, first rail member 31B, and second rail member 32B, and further includes rolling member 33 and retainer 34. Rolling member 33 and retainer 34 have the same configurations as those of rolling member 33 and retainer 34 described for first supporting part 30A, and therefore, they are denoted with the same reference numerals and reiterated descriptions will be omitted.

First groove part 15B is a groove formed in a recessed shape provided to extend in the Z direction at outer peripheral surface 13 of frame part 12 of holding part 10. Second groove part 26B is a groove formed to be recessed in a V-shape and provided to extend in the Z direction at inner peripheral surface 23 of frame part 22 of housing part 20. First groove part 15B and second groove part 26B are disposed to face each other.

First rail member 31B is a member with a flat shape extending in the longitudinal direction that is the Z direction at the time of attaching. First rail member 31B is attached to the bottom part of the first groove part 15B. First rail member 31B is flat at guide surface 31Ba on the side on which rolling member 33 is disposed in a rollable manner, and first rail member 31B makes contact with rolling member 33 at one point. Thus, the position of rolling member 33 is changeable within the groove of first groove part 15B.

Second rail member 32B is a V-shaped cross-sectional member extending in the longitudinal direction that is the Z direction at the time of attaching. Second rail member 32B includes V-shaped guide groove 32Ba on the side on which rolling member 33 is disposed in a rollable manner, and is attached to second groove part 26B on the side opposite to that side.

First rail member 31B is attached to first groove part 15B and second rail member 32B is attached to second groove part 26B, and thus guide surface 31Ba and guide groove 32Ba thereof are disposed to face each other.

Between guide surface 31Ba of first rail member 31B and guide groove 32Ba of second rail member 32B arranged in the above-mentioned manner, the plurality of rolling members 33 held by retainer 34 is housed and sandwiched in a rollable manner. The plurality of rolling members 33 rolls along guide groove 32B a so as to be guided in the Z direction.

As described above, the position of rolling member 33 is changeable in the groove of first groove part 15B, thus allowing for the relative displacement of outer peripheral surface 13 and inner peripheral surface 23, i.e., the relative displacement of holding part 10 and housing part 20 in the circumferential direction of outer peripheral surface 13 and inner peripheral surface 23. For example, with the position of third supporting part 30C described later as a reference (rotation center), holding part 10 is relatively displaceable in the rotational direction with respect to housing part 20.

As described above, holding part 10 is pressed by first supporting part 30A, and accordingly rolling member 33 and first groove part 15B (first rail member 31B) are relatively displaced in the circumferential direction in accordance with the press at second supporting part 30B. Through this relative displacement, the contact position of rolling member 33 and first groove part 15B (first rail member 31B) is shifted, and the support position of holding part 10 with respect to second supporting part 30B is set when the force acting on the engaged portions is stabilized along with that shift.

That is, when the force acting on first groove part 15B (first rail member 31B), and rolling member 33 and second groove part 26B (second rail member 32B), which are the engaged portions, is stabilized, the supporting position (engaging position) of holding part 10 with respect to second supporting part 30B is set. In this manner, even when there is an individual difference in the dimensions of the components making up optical element driving device body 4 and their assembled state, stable support with no backlash can be achieved.

Also in second supporting part 30B, by forming first rail member 31B and second rail member 32B with a metal material or the like harder than holding part 10 and housing part 20, first groove part 15B and second groove part 26B are less deformed even when a pressing force is received from rolling member 33. With this configuration, second supporting part 30B can stably support holding part 10 in a movable manner in the Z direction.

Third Supporting Part

Unlike the above-mentioned first supporting part 30A, third supporting part 30C does not include second rail member 32A functioning as a biasing member, and therefore does not require the installation space in comparison with first supporting part 30A. Therefore, third supporting part 30C can be disposed at the side between corner portion 22bD and corner portion 22bC by avoiding four corner portions 22bA, 22bB, 22bC and 22bD. In this manner, third supporting part 30C can be installed by avoiding four corner portions 22bA, 22bB, 22bC and 22bD, and thus driving parts 40A and 40B can be disposed.

As illustrated in FIG. 6, third supporting part 30C includes first groove part 15C, second groove part 26C, first rail member 31C, and second rail member 32C, and further includes rolling member 33, and retainer 34. Rolling member 33 and retainer 34 have the same configurations as those of rolling member 33 and retainer 34 described for first supporting part 30A, and therefore, they are denoted with the same reference numerals and reiterated descriptions will be omitted.

First groove part 15C is a groove formed to be recessed in a V-shape and provided to extend in the Z direction at outer peripheral surface 13 of frame part 12 of holding part 10. Second groove part 26C is a groove formed to be recessed in a V-shape and provided to extend in the Z direction at inner peripheral surface 23 of frame part 22 of housing part 20. First groove part 15C and second groove part 26C are disposed to face each other.

First rail member 31C is a V-shaped cross-sectional member extending in the longitudinal direction that is the Z direction at the time of attaching. First rail member 31C includes V-shaped guide groove 31Ca on the side on which rolling member 33 is disposed, and is attached to first groove part 15C on the side opposite to that side.

Second rail member 32C is a V-shaped cross-sectional member extending in the longitudinal direction that is the Z direction at the time of attaching. Second rail member 32C includes V-shaped guide groove 32Ca on the side on which rolling member 33 is disposed, and is attached to second groove part 26C on the side opposite to that side. Since first rail member 31C is attached to first groove part 15C, and second rail member 32C is attached to second groove part 26C, guide groove 31Ca and guide groove 32Ca thereof are disposed to face each other.

Between guide groove 31Ca of first rail member 31C and guide groove 32Ca of second rail member 32C arranged in this manner, the plurality of rolling members 33 held by retainer 34 is housed and sandwiched in a rollable manner. The plurality of rolling members 33 rolls along guide groove 31Ca and guide groove 32Ca so as to be guided in the Z direction.

At third supporting part 30C, rolling member 33 is sandwiched by first rail member 31C and second rail member 32C with a V-shaped cross-section, and therefore holding part 10 and housing part 20 where they are attached are allowed to displace in the Z axis orthogonal direction, but not allowed to displace in the rotational direction around the Z axis.

In this manner, since the displacement of holding part 10 in the rotational direction around the Z axis is allowed, third supporting part 30C serves as the reference position (rotation center) of the displacement of holding part 10 with respect to housing part 20, thus allowing for the displacement of holding part 10 at second supporting part 30B. As a result, at second supporting part 30B, the individual difference in the dimensions of the components making up optical element driving device body 4 and the individual difference in the assemble state can be accommodated.

Also at third supporting part 30C, by forming first rail member 31C and second rail member 32C with a metal material or the like harder than holding part 10 and housing part 20, first groove part 15C and second groove part 26C are less deformed even when a pressing force is received from rolling member 33. With this configuration, third supporting part 30C can stably support holding part 10 in a movable manner in the Z direction.

With First supporting part 30A, second supporting part 30B, and third supporting part 30C having the above-mentioned configurations, holding part 10 is stably supported in a movable manner in the Z direction with respect to housing part 20.

Note that at first supporting part 30A, second supporting part 30B, and third supporting part 30C, an opposing recess recessed from outer peripheral surface 13 and/or inner peripheral surface 23 and extended in the Z direction may be provided in a portion facing retainer 34 in outer peripheral surface 13 and/or inner peripheral surface 23.

Grease is applied to rolling member 33 held by retainer 34. If the grease is scattered from rolling member 33 due to the impact of dropping or the like, retainer 34 may stick to outer peripheral surface 13 and/or inner peripheral surface 23 due to the scattered grease. In consideration of such a possibility, by providing the above-described opposing recess, the sticking of retainer 34 with the grease can be prevented by making the scattered grease less make contact with retainer 34.

Driving Part

Driving parts 40A and 40B drive holding part 10 in the Z direction with respect to housing part 20. As illustrated in FIG. 3, driving parts 40A and 40B are disposed at two portions separated from each other in the circumferential direction at inner peripheral surface 23 (outer peripheral surface 13). With the above-described first supporting part 30A, second supporting part 30B, third supporting part 30C and driving parts 40A and 40B, optical element driving device body 4 can drive lens part 2 in the Z direction together with holding part 10, thus achieving the AF function.

In the example illustrated in FIG. 3, driving parts 40A and 40B are disposed at corner portions 22*b*B and 22*b*C that are point symmetrical about optical axis OA in plan view, which are corner portions different from corner portion 22*b*A where first supporting part 30A is disposed. With this arrangement, holding part 10 can be stably moved even in the case where the weight of the optical elements such as lens part 2 increases.

As driving parts 40A and 40B, an actuator including a piezoelectric element, such as an ultrasound motor, is used.

Figure 7:
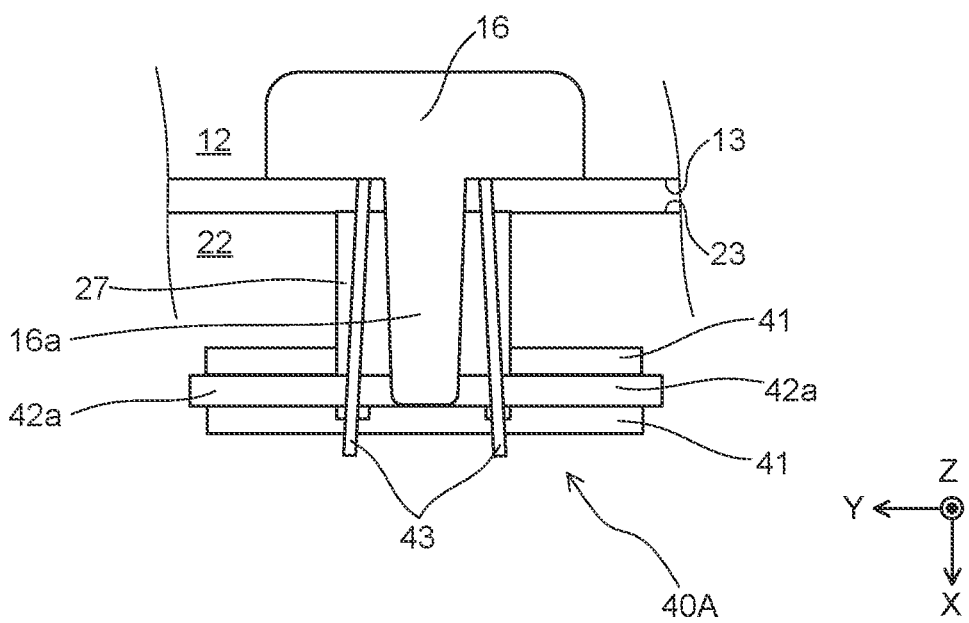
FIG. 7 is an enlarged view illustrating a driving part of the optical element driving device body illustrated in FIG. 3.
Figure 8:
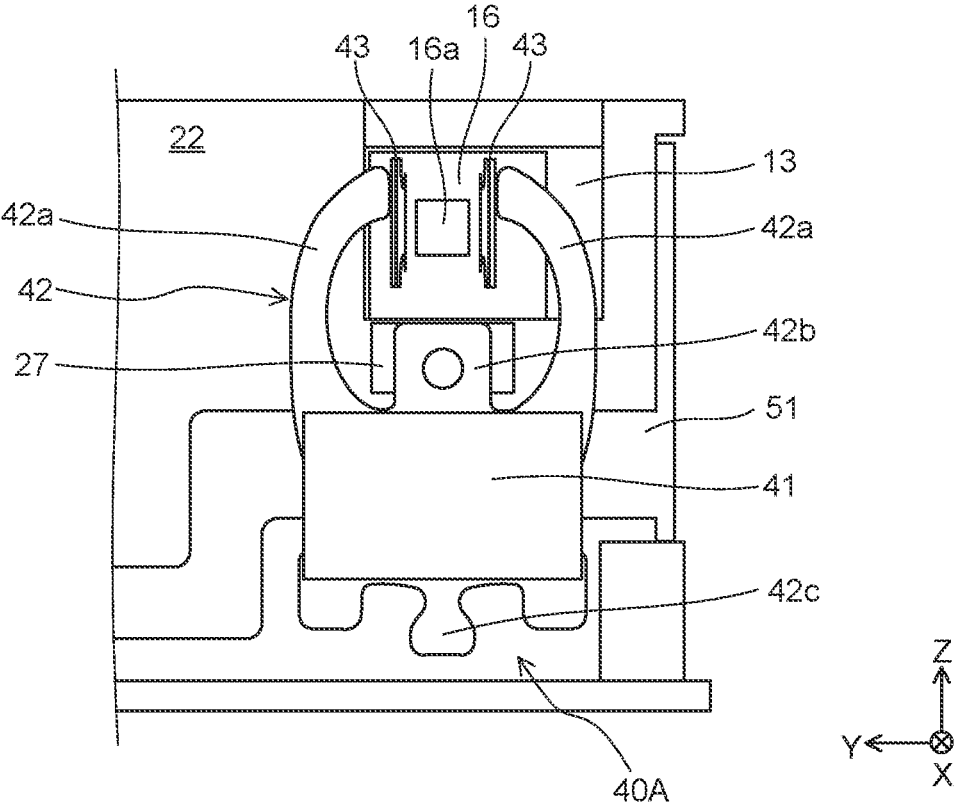
FIG. 8 is a diagram illustrating a driving part of the optical element driving device body illustrated in FIG. 7 as viewed from a lateral side.

Driving parts 40A and 40B are described below with reference to FIGS. 7 and 8. FIG. 7 is an enlarged view illustrating driving part 40A of optical element driving device body 4 illustrated in FIG. 3. FIG. 8 is a diagram illustrating driving part 40A of optical element driving device body 4 illustrated in FIG. 7 as viewed from a lateral side. Note that FIGS. 7 and 8 illustrate driving part 40A, but driving part 40B has the same configuration as that of driving part 40A, and therefore detailed illustration and description will be omitted.

Driving part 40A includes piezoelectric element 41, resonance part 42, power transmission 43 and the like. The driving force generated at resonance part 42 through resonation with vibration of piezoelectric element 41 is transmitted to holding part 10 through power transmission 43. At driving part 40A, resonance part 42 makes up an active element while power transmission 43 makes up a passive element.

Piezoelectric element 41 is a plate-shaped element formed of ceramic material, and generates vibration when radio frequency voltage is applied, for example. Two piezoelectric elements 41 are disposed to sandwich the barrel part (whose reference numeral is omitted) of resonance part 42. Although not illustrated in the drawings, a connection wiring provided in FPC 51 described later is electrically connected to piezoelectric element 41 so as to apply a voltage to piezoelectric element 41.

Resonance part 42 is formed of a conductive material, and converts a vibration motion into a linear motion through resonation with vibration of piezoelectric element 41. Resonance part 42 is formed by laser processing, etching or pressing or the like of a metal plate.

Resonance part 42 includes a substantially rectangular barrel part sandwiched by piezoelectric element 41, two arm parts 42*a* extending in the Z direction from the both side portions of the barrel part, protruding part 42*b* extending in the Z direction from a center portion of the barrel part, energization part 42*c* extending in the direction opposite to protruding part 42*b* side from a center portion of the barrel part, and the like.

The barrel part of resonance part 42 is a portion sandwiched by piezoelectric element 41. Two arm parts 42*a* have symmetric shapes, and symmetrically deform through resonation with vibration of piezoelectric element 41. Resonance part 42 is disposed such that two arm parts 42*a* extend in the Z direction so as to sandwich power transmission 43 at the free end part.

A through hole for insertion of a rivet and the like is formed in protruding part 42*b*. Protruding part 42*b* is fixed to fixed part 27 formed at frame part 22 of housing part 20 with a rivet and the like. Energization part 42*c* is a portion making up a power feeding line to piezoelectric element 41 through the barrel part of resonance part 42, and a connection wiring provided in FPC 51 is electrically connected thereto although not illustrated in the drawings.

Through the above-described electrical connection, a voltage is applied to piezoelectric element 41 bonded to the barrel part of resonance part 42 in the thickness direction, and a vibration is generated. Resonance part 42 has at least two resonance frequencies, and deforms in different behaviors for the respective resonance frequencies. In other words, resonance part 42 is set to have an entire shape to deform in different behaviors for the respective two resonance frequencies.

Here, the different behaviors are a behavior of moving power transmission 43 forward and a behavior of moving power transmission 43 backward, in the Z direction. Thus, by vibrating resonance part 42 at a desired resonance frequency, power transmission 43 can be moved forward or backward in the Z direction.

Power transmission 43 is a chucking guide with a predetermined length in the Z direction. Power transmission 43 is a member that biases two arm parts 42*a* of resonance part 42 in the expanding direction. The structure of power transmission 43 can be changed as necessary, but in this case, as an example, power transmission 43 comprises a pair of leaf springs, and is implanted outward from attaching part 16 fit to outer peripheral surface 13 of frame part 12 of holding part 10.

In this manner, two arm parts 42*a* of resonance part 42 make contact with power transmission 43, which is a pair of leaf springs, so as to push it inward. Further, power transmission 43 functions as a leaf spring, and therefore when two arm parts 42*a* make contact with it, the driving force generated by the deformation of resonance part 42 is efficiently transmitted, and, with transmission 43, a biasing force acts in the direction of pushing arm part 42*a*. In this manner, the driving force generated by the deformation of resonance part 42 is more efficiently transmitted to power transmission 43, and the driving force of driving part 40A is transmitted to holding part 10.

Thus, when a voltage is applied to driving part 40A, piezoelectric element 41 vibrates, and resonance part 42 deforms in a behavior corresponding to the frequency. With the driving force of driving part 40A, power transmission 43 slides in the Z direction. Along with this, holding part 10 moves in the Z direction, thus performing the focusing.

Note that at the above-described attaching part 16, protrusion part 16*a* protruding outward from outer peripheral surface 13 side is provided between a pair of power transmissions 43. Protrusion part 16*a* extends along power transmission 43 in plan view illustrated in FIG. 7. For example, power transmission 43 may move toward protrusion part 16*a* due to the impact of dropping or the like, but by providing protrusion part 16*a*, the movement of power transmission 43 is restricted by the contact with protrusion part 16*a*, thus preventing deformation of power transmission 43. As a result, the contact state of arm part 42*a* and power transmission 43 can be maintained, and the driving force generated by the deformation of resonance part 42 can be efficiently transmitted from arm part 42a to power transmission 43.

Substrate Part

Figure 9:
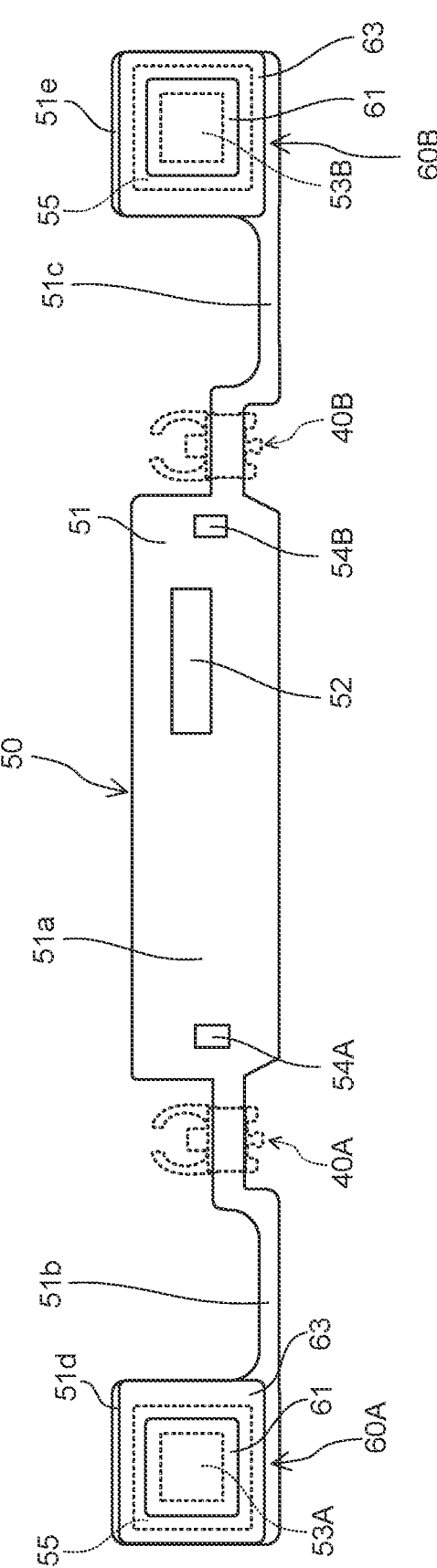
FIG. 9 is a plan view illustrating a substrate part of the optical element driving device body illustrated in FIG. 3, and is a planar development diagram of the substrate part.
Figure 10:
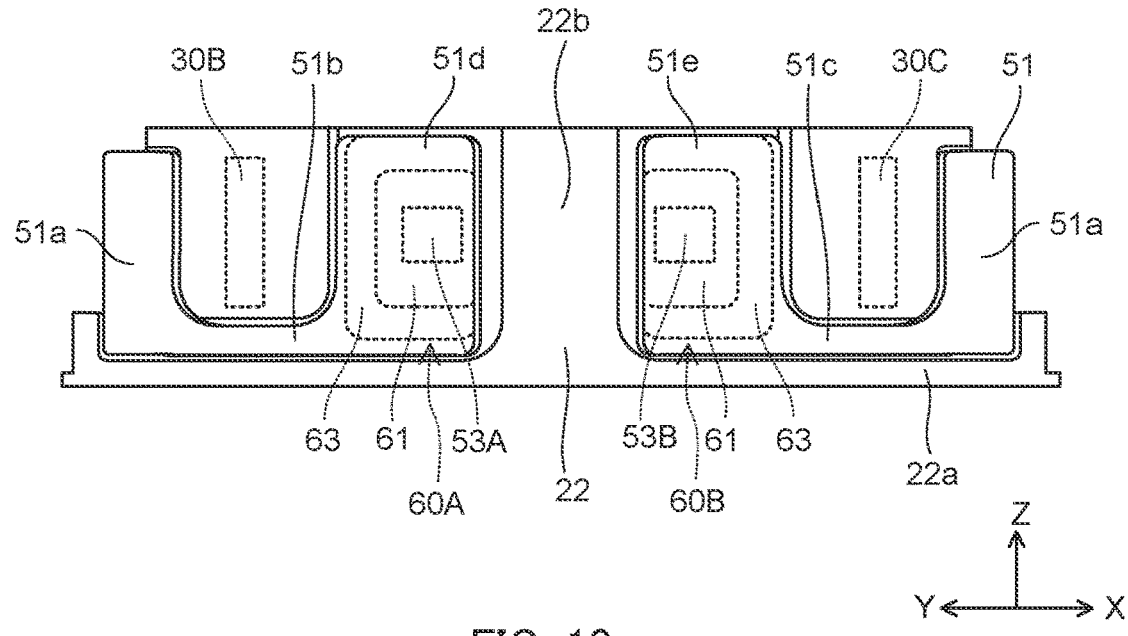
FIG. 10 is a diagram illustrating the optical element driving device body illustrated in FIG. 3 as viewed from the outside.

Substrate part 50 is described below with reference to FIGS. 9 and 10, together with FIG. 3. FIG. 9 is a plan view illustrating substrate part 50 of optical element driving device body 4 illustrated in FIG. 3, and is a planar development diagram of substrate part 50. FIG. 10 is a diagram illustrating optical element driving device body 4 illustrated in FIG. 3 as viewed from outside, and is a diagram as viewed from direction D1 illustrated in FIG. 3. Note that driving parts 40A and 40B are not mounted on FPC 51 of substrate part 50, but FIG. 9 illustrates driving parts 40A and 40B for the sake of clarity of the positional relationship.

Substrate part 50 includes a circuit that drives driving parts 40A and 40B. Substrate part 50 includes FPC (flexible printed board) 51, driver IC 52 (in the present invention, the control element), inductors 53A and 53B, position detection sensors 54A and 54B and the like.

FPC 51 is a flexible substrate, and comprises a stack of a thin insulating layer such as a resin film and/or a metal layer such as a copper foil. Although not illustrated in the drawings, the metal layer is formed as a circuit of a signal line and/or a power source line, and is electrically connected to driving parts 40A and 40B, driver IC 52, inductors 53A and 53B, position detection sensors 54A and 54B and the like.

Driver IC 52 is an IC that controls a driving signal to drive driving parts 40A and 40B. For example, driver IC 52 outputs a driving signal based on the detection signal detected by position detection sensors 54A and 54B, and the output driving signal is output to driving parts 40A and 40B through inductors 53A and 53B.

Inductors 53A and 53B, each of which includes a coil, increase the voltage (input voltage) of the driving signal input from driver IC 52, and output it to driving parts 40A and 40B, respectively.

Position detection sensors 54A and 54B are magnetic sensors such as Hall elements, for example. By detecting the intensity of the magnetic force of magnets 14A and 14B facing each other, position detection sensors 54A and 54B acquire the relative position of holding part 10 and housing part 20 in the Z direction, and output it as a detection signal.

Note that although not illustrated in the drawings, FPC 51 is provided with a connection wiring that is electrically connected to driving parts 40A and 40B.

FPC 51 is a single long substrate to mount on FPC 51 the above-described driver IC 52, inductors 53A and 53B, and position detection sensors 54A and 54B. FPC 51 is disposed along the outer peripheral surface 24 of frame part 22 of housing part 20 so as to substantially encircle outer peripheral surface 24.

To dispose FPC 51 along outer peripheral surface 24, outer peripheral surface 24 at corner portion 22bA is formed in an arc-like shape in plan view, for example. In this manner, FPC 51 can be disposed in an intimate contact manner at outer peripheral surface 24 at corner portion 22bA. In view of this, it is not necessary to increase the size of cover 3 disposed outside FPC 51, the reduction of the entire device can be achieved, and cost reduction can be achieved.

In addition, FPC 51 includes FPC main portion 51a, FPC constricted portions 51b and 51c, and FPC end portions 51d and 51e. FPC main portion 51a connects FPC constricted portion 51b and FPC end portion 51d on one end side and FPC constricted portion 51c and FPC end portion 51e on the other end side in the longitudinal direction, and driver IC 52 and position detection sensors 54A and 54B are mounted thereto.

FPC constricted portions 51b and 51c are portions with a reduced width in the direction orthogonal to the longitudinal direction, and are disposed between FPC main portion 51a and FPC end portion 51d, and between FPC main portion 51a and FPC end portion 51e, respectively. As illustrated in FIG. 10, FPC constricted portions 51b and 51c are portions formed to avoid the portion of housing part 20 where second supporting part 30B and third supporting part 30C are disposed. By providing such FPC constricted portions 51b and 51c, it is not necessary to increase the size of cover 3 disposed outside FPC 51, the reduction of the entire device can be achieved, and cost reduction can be achieved.

Inductors 53A and 53B are mounted at FPC end portions 51d and 51e, respectively, which are the both end portions in the longitudinal direction of FPC 51. As described above, inductors 53A and 53B include coils, and there are noise radiation and leakage flux from the coils. To ensure the distance from position detection sensors 54A and 54B that may be affected by the leakage flux and the noise radiation, inductors 53A and 53B are disposed at FPC end portions 51d and 51e. On the other hand, for position detection, position detection sensors 54A and 54B are disposed at a position close to driving parts 40A and 40B where the driving force acts (application point).

In addition, optical element driving device body 4 includes cover members 60A and 60B and metal layer 55 to suppress the leakage flux and the noise.

Cover members 60A and 60B are formed of a metal material that shields the leakage flux and the noise. Cover members 60A and 60B include lid part 61, flange part 63, an opening and the like.

Lid part 61 is a capped quadrangular cylindrical member with an opening. Flange part 63 extends at the outer periphery of the opening of lid part 61. More specifically, it extends along the surface of FPC end portions 51d and 51e at the outer periphery edge of lid part 61, which is the outer periphery part of opening.

Cover members 60A and 60B are configured to house inductors 53A and 53B mounted on FPC end portions 51d and 51e in the opening of lid part 61, and cover them with flange part 63 disposed on FPC end portions 51d and 51e.

In this manner, cover members 60A and 60B include not only lid part 61, but also flange part 63. Thus, the leakage flux and the noise radiated from inductors 53A and 53B to cover members 60A and 60B side can be shielded by lid part 61 and flange part 63 in a wide range. As a result, the magnetic flux and the noise leaked to the outside can be reduced in comparison with a cover member with no flange part.

Flange part 63 may be fixed to the surface of FPC end portions 51d and 51e with an adhesive or the like, for example. The contact area of the surfaces of FPC end portions 51d and 51e and flange part 63 are wider in comparison with the case where no flange part is provided, and thus cover members 60A and 60B can be reliably fixed to the surfaces of FPC end portions 51d and 51e.

At FPC end portion 51d, metal layer 55 is disposed to face inductor 53A attached to FPC end portion 51d. At FPC end portion 51d, metal layer 55 is provided at the surface on the side opposite to the surface where inductor 53A is mounted, for example. In plan view, metal layer 55 is formed in a solid pattern including at least the region where inductor 53A is disposed.

Since metal layer 55 is provided at FPC end portion 51*d* where inductor 53A is mounted in this manner, the leakage flux and the noise radiated from inductor 53A to FPC end portion 51*d* side can be shielded by metal layer 55. As a result, in comparison with an FPC with no metal layer 55 described above, the magnetic flux and the noise leaked to the outside through FPC 51 can be reduced.

Further, metal layer 55 is desirably formed to overlap flange part 63 as illustrated in FIG. 9. As a result, the gap between flange part 63 and metal layer 55 can be reduced. This is especially effective for the case where an FPC is used as a substrate.

Since the gap between flange part 63 and metal layer 55 is reduced in this manner, substantially the entire periphery of inductor 53A can be covered with cover member 60A and metal layer 55. In this manner, the leakage flux and the noise radiated from inductor 53A can be shielded by cover member 60A and metal layer 55. As a result, the magnetic flux and the noise leaked to the outside can be reduced.

Cover members 60A and 60B comprise a metal material that reduces the leakage flux and the noise. For cover members 60A and 60B, a lamination structure in which at least layers comprising copper and nickel are stacked on a layer comprising iron such as SPCC (Steel Plate Cold Commercial), which is a ferromagnetic material, is used, for example. In this lamination structure, the layers are stacked in the order of the iron layer, the copper layer, and the nickel layer, and thus the rusting of the iron layer can be prevented.

The copper layer is stacked also for the purpose of offsetting the influence of the increase of the inductance due to the iron layer, and the noise shielding property can be improved by making the copper layer thicker than the nickel layer. As such, for cover members 60A and 60B, it is preferable to adopt a configuration in which, at least, the copper layer is thicker than the nickel layer in the lamination structure in which an iron layer and a copper layer and a nickel layer are stacked In addition, in the circuit of FPC 51, metal layer 55 may use a ground layer or a power source layer for supplying the power source. In addition, metal layer 55 is not limited to a single layer, and may comprise a plurality of layers stacked through an insulating layer. For example, in the case where it comprises two layers stacked through an insulating layer, one layer and the other layer may be the above-described power source layer and ground layer.

In addition, in the case where the ground layer or the power source layer of the circuit of FPC 51 is not used as metal layer 55, metal layer 55 may comprise a stack of a plurality of metal layers as with cover members 60A and 60B.

Figure 11:
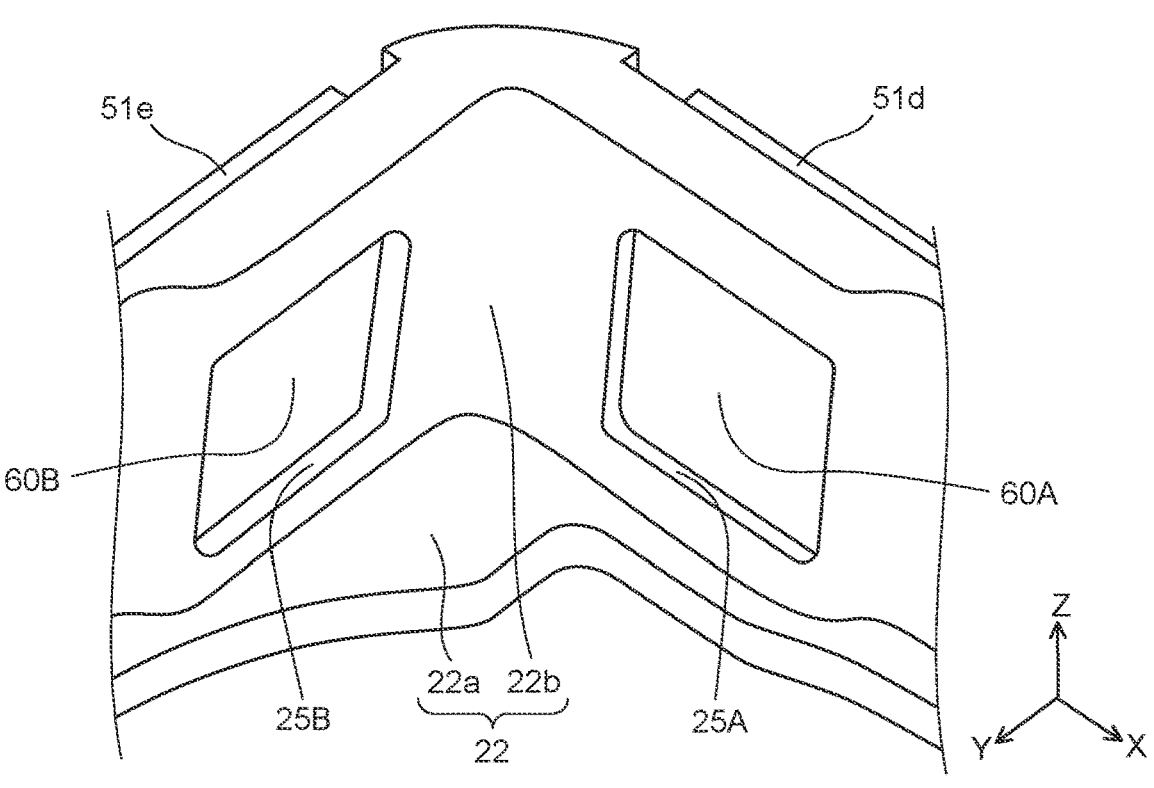
FIG. 11 is a diagram illustrating a housing part of the optical element driving device body illustrated in FIG. 3 as viewed from the inside.

FIG. 11 is a diagram illustrating housing part 20 of optical element driving device body 4 illustrated in FIG. 3 as viewed from the inside, and is a diagram as viewed from direction D2 illustrated in FIG. 3 in the state where lens part 2 and holding part 10 are detached.

To achieve size reduction of the device, housing part 20 includes insertion parts 25A and 25B to which cover members 60A and 60B with the above-described configuration are inserted. As illustrated in FIG. 11, insertion parts 25A and 25B are provided to penetrate side wall part 22*b* of frame part 22, but it is possible to adopt a configuration, such as a recess, that does not penetrate side wall part 22*b* as long as cover members 60A and 60B can be inserted.

By inserting cover members 60A and 60B to such insertion parts 25A and 25B, the reduction of the entire device can be achieved, and cost reduction can be achieved.

In addition, in the case of the configuration illustrated in FIG. 11, for example, flange part 63 is fixed between housing part 20 and FPC 51 by fixing the part between housing part 20 and FPC end portion 51*d* with an adhesive or the like, and therefore flange part 63 need not be fixed on the surface of FPC end portions 51*d* and 51*e*. In this manner, the manufacturing process of optical element driving device body 4 can be simplified.

In addition, in the case where cover members 60A and 60B are inserted so as to fit to insertion parts 25A and 25B, cover members 60A and 60B serve also as a reinforcement of housing part 20 including insertion parts 25A and 25B, and thus deformation of housing part 20 and the like can be suppressed.

Arrangement Inside Optical Element Driving Device Body

Figure 12:
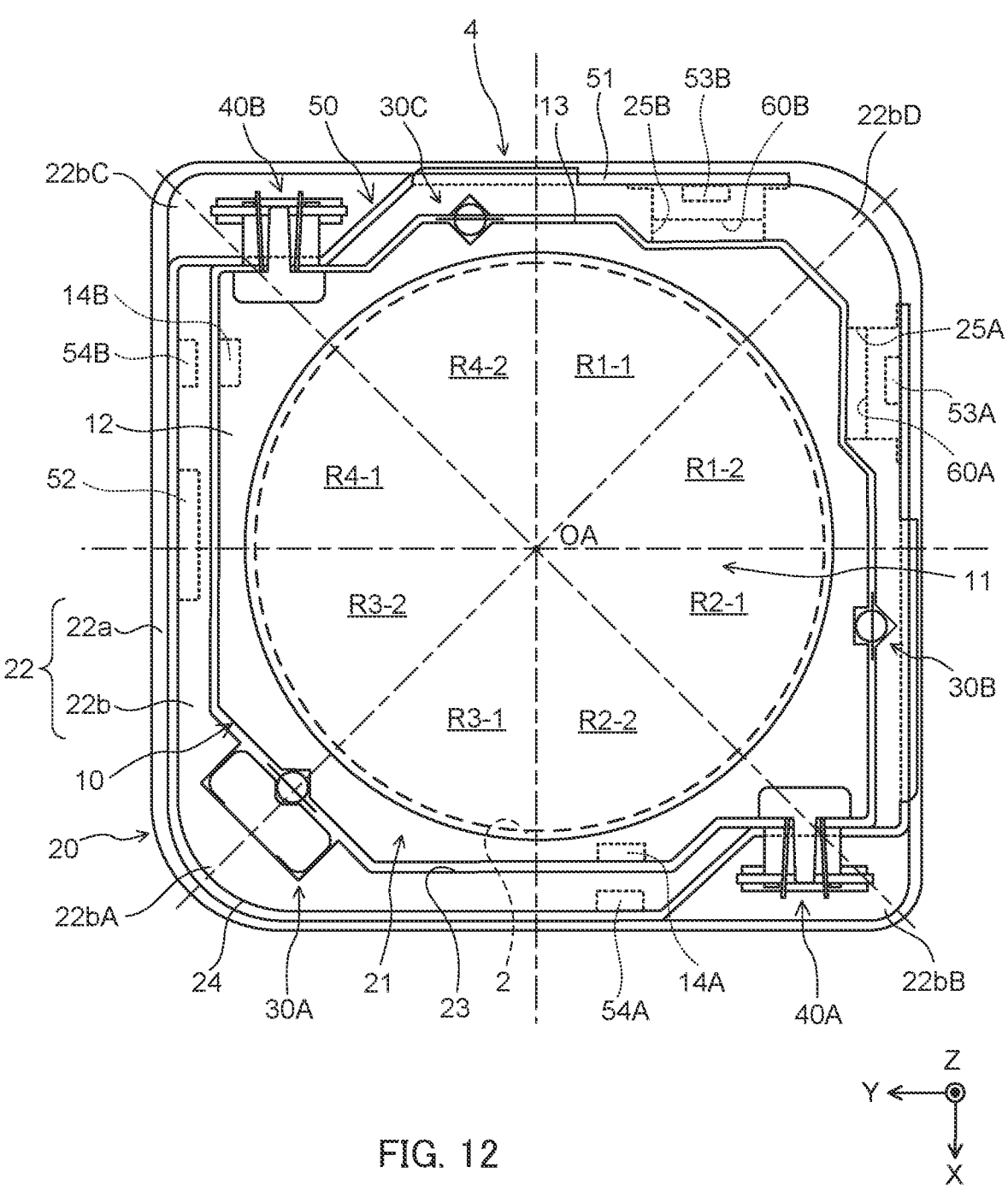
FIG. 12 is a plan view illustrating a case where the optical element driving device body illustrated in FIG. 3 is divided into equal eights around an optical axis.

Arrangements of inductors 53A and 53B, position detection sensors 54A and 54B and the like in optical element driving device body 4 are described below with reference to FIGS. 3 and 12. FIG. 12 is a plan view illustrating a case where optical element driving device body 4 illustrated in FIG. 3 is divided into e equal eights around the optical axis.

As described above, inductors 53A and 53B entail leakage flux from its coil, and optical element driving device body 4 includes position detection sensors 54A and 54B using a magnetic sensor as described above. As such, under the influence of the leakage flux from the coil of inductors 53A and 53B, the detection accuracy of the position of holding part 10 detected by position detection sensors 54A and 54B may possibly be reduced.

In view of this, in the present embodiment, to ensure a predetermined distance between inductors 53A and 53B and position detection sensors 54A and 54B, the following arrangement is employed. More specifically, inductors 53A and 53B and position detection sensors 54A and 54B are disposed in respective different regions among regions R1 to R4 as equal quarters divided around optical axis OA. In the example illustrated in FIG. 3, inductors 53A and 53B are disposed in region R1, position detection sensor 54A is disposed in region R2, and position detection sensor 54B is disposed in region R4.

Further, with reference to FIG. 12, inductors 53A and 53B and position detection sensors 54A and 54B are disposed in respective different regions among regions R1-1 to R4-2 as equal eights divided around optical axis OA, with at least one region interposed therebetween. In the example illustrated in FIG. 12, inductor 53A is disposed in region R1-2, inductor 53B is disposed in region R1-1, position detection sensor 54A is disposed in region R2-2, and position detection sensor 54B is disposed in region R4-1. Inductor 53A and position detection sensor 54A are disposed in region R1-2 and region R2-2, respectively with region R2-1 therebetween, and inductor 53B and position detection sensor 54B are disposed in region R1-1 and region R4-1, respectively with region R4-2 therebetween.

In addition, as illustrated in FIGS. 3 and 12, housing part 20 has a rectangular shape in plan view, and sets inductors 53A and 53B and position detection sensors 54A and 54B at different sides in housing part 20. In the example illustrated in FIGS. 3 and 12, inductor 53A is disposed at the side between corner portion 22*b*D and corner portion 22*b*B, and inductor 53B is disposed at the side between corner portion 22*b*D and corner portion 22*b*C. Further, position detection sensor 54A is disposed at the side between corner portion 22*b*B and corner portion 22*b*A, and position detection sensor 54B is disposed at the side between corner portion 22*b*C and corner portion 22*b*A.

Note that while inductor 53A, second supporting part 30B, driving part 40A, and position detection sensor 54A are disposed in this order in the clockwise direction along the side of housing part 20, but the order of second supporting part 30B and driving part 40A may be reversed. Likewise, while inductor 53B, third supporting part 30C, driving part 40B, and position detection sensor 54B are disposed in this order in the counterclockwise direction along the side of housing part 20, but the order of third supporting part 30C and driving part 40B may be reversed.

In this manner, by disposing inductors 53A and 53B and position detection sensors 54A and 54B at different regions or different sides, a predetermined distance between inductors 53A and 53B and position detection sensors 54A and 54B can be ensured. In this manner, the influence of the leakage flux from the coil of inductors 53A and 53B can be suppressed, and as a result, reduction in accuracy of the position detection due to position detection sensors 54A and 54B can be prevented.

In the configuration illustrated in FIG. 3, driving part 40A and driving part 40B are disposed in respective diagonally opposite regions among four equally divided regions R1 to R4. In the example illustrated in FIG. 3, driving part 40A is disposed in region R2, and driving part 40B is disposed in region R4 diagonally opposite to region R2.

Then, driving parts 40A and 40B for driving holding part 10 and position detection sensors 54A and 54B for detecting the position of holding part 10 are disposed in the proximity of each other. In the example illustrated in FIG. 3, since driving part 40A is disposed in region R2, position detection sensor 54A is disposed in region R2, and driving part 40A and position detection sensor 54A are disposed in the same region R2. In addition, since driving part 40B is disposed in region R4, position detection sensor 54B is disposed in region R4, and driving part 40B and position detection sensor 54B are disposed in the same region R4.

In this manner, position detection sensors 54A and 54B are provided in the proximity of driving parts 40A and 40B for driving holding part 10, and thus the detection accuracy of the position of holding part 10 driven by driving parts 40A and 40B can be improved.

In addition, inductors 53A and 53B entail noise due to leakage flux of its coil, and optical element driving device body 4 includes driver IC 52 for controlling the driving signal for driving parts 40A and 40B as described above. Driver IC 52 may be affected by the noise due to the leakage flux from the coil of inductors 53A and 53B.

In view of this, to ensure a predetermined distance of inductors 53A and 53B and driver IC 52, inductors 53A and 53B and driver IC 52 are disposed in respective different regions among regions R1 to R4 as equal quarters divided around optical axis OA. In the example illustrated in FIG. 3, inductors 53A and 53B are disposed in region R1, and driver IC 52 is disposed in region R3 and R4.

In this manner, by disposing inductors 53A and 53B and driver IC 52 in regions different from each other, a predetermined distance of inductors 53A and 53B and driver IC 52 can be ensured. In this manner, the influence of the noise due to the leakage flux from the coil of inductors 53A and 53B can be suppressed, and as a result, the influence on the driving signal output from driver IC 52 can be prevented.

Other Embodiments

The present invention is not limited to the above embodiments, but can be modified to the extent not to depart from the gist thereof.

For example, while two position detection sensors 54A and 54B are provided in the present embodiment, the number of the position detection sensor may be one. In this case, it is desirable to provide the position detection sensor in the vicinity of third supporting part 30C serving as the reference (rotation center) of holding part 10 that is relatively displaceable with respect to housing part 20, and in the example illustrated in FIG. 3, position detection sensor 54B corresponds to the position detection sensor in the vicinity of third supporting part 30C.

In addition, while first rail members 31A to 31C and second rail members 32A to 32C are provided in first groove parts 15A to 15C, recess 26A and second groove parts 26B and 26C in the present embodiment, they may not be provided. In this case, it is possible to adopt a configuration in which first groove parts 15A to 15C, recess 26A, and second groove parts 26B and 26C directly sandwich rolling member 33.

In addition, in the present embodiment, it is desirable that the angles between first supporting part 30A, second supporting part 30B, and third supporting part 30C be 120°, but this angle may be changed as necessary. In the case where first supporting part 30A, second supporting part 30B, and third supporting part 30C are disposed at angles other than 120°, it is desirable to adopt the following configurations and arrangements.

For example, in plan view, the direction of pressing rolling member 33 by second rail member 32A serving as the biasing member of first supporting part 30A is set to the direction toward optical axis OA, and second supporting part 30B and third supporting part 30C are disposed at locations that are line-symmetric with respect to that direction. With such configurations and arrangements, the pressing force received from the first supporting part 30A side is equalized in second supporting part 30B and third supporting part 30C, and thus holding part 10 can be stably support.

In addition, the supporting part may be separately disposed at three or more portions in the circumferential direction of inner peripheral surface 23 (outer peripheral surface 13). In this case, it is desirable to dispose the supporting part at multiple of three portions, such as six and nine portions, with three-point support capable of stably supporting the object as a basic unit, so as to further support between the three-point supports.

In addition, while smartphone M is described as an example in the present embodiment, the present invention is applicable to a camera-mounted device including a camera module and an image processing part for processing the image information obtained by the camera module. The camera-mounted device includes an information device and a transport device. Examples of the information device include a camera-equipped mobile phone, a note-type personal computer, a tablet terminal, a mobile game machine, a web-camera, a camera-equipped in-vehicle device (such as a rear-view monitor device and a drive recorder device) and the like. In addition, the transport device includes an automobile and a drone, for example.

Figure 13A:
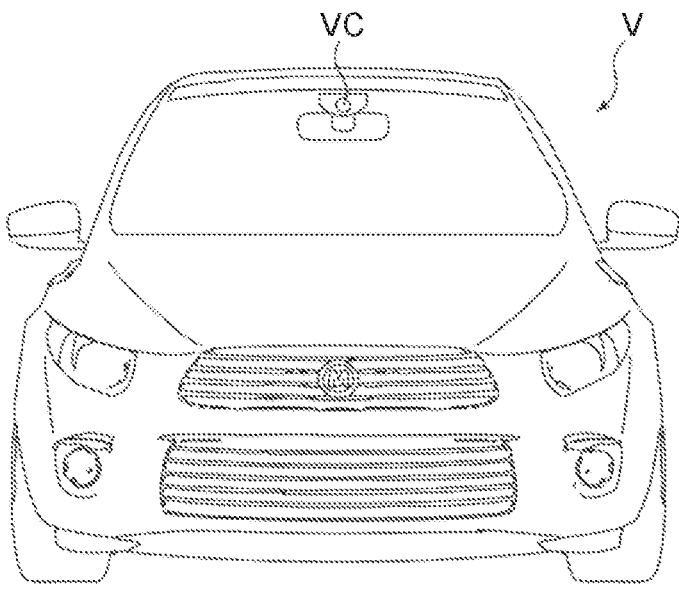
FIG. 13A is a front view illustrating an automobile as a camera-mounted device equipped with an in-vehicle camera module.
Figure 13B:
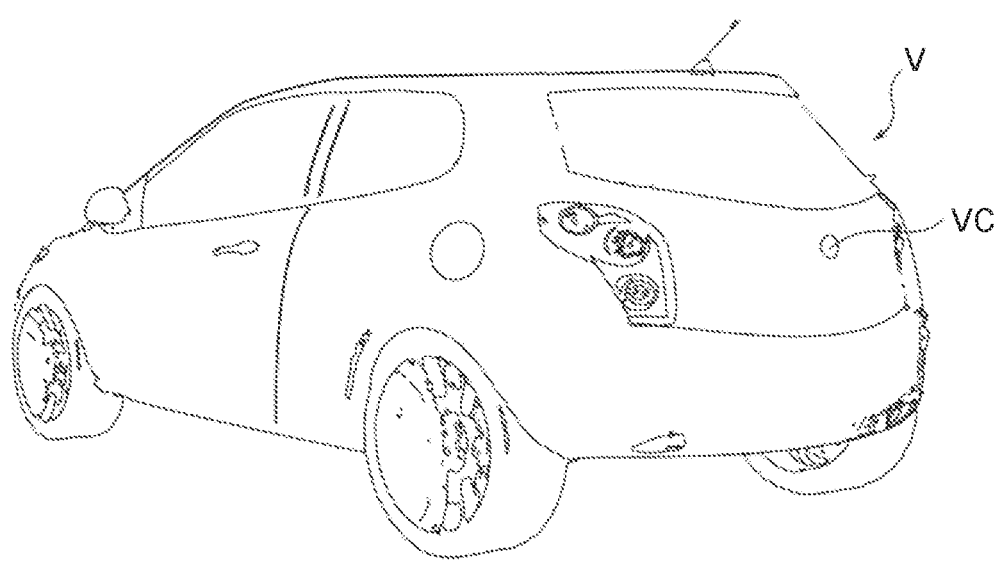
FIG. 13B is a perspective view of the automobile illustrated in FIG. 13A as viewed from an oblique rearward side.

FIGS. 13A and 13B are diagrams illustrating automobile V serving as a camera-mounted device equipped with in-vehicle camera module VC (Vehicle Camera). FIG. 13A is a front view of automobile V, and FIG. 13B is a rear perspective view of automobile V. Automobile V is equipped with camera module A described in the present embodiment as in-vehicle camera module VC. As illustrated in FIGS. 13A and 13B, in-vehicle camera module VC is attached to the windshield to face forward, or attached to the rear gate to face rearward, for example. This in-vehicle camera module VC is used for a rear-view monitor, a drive recorder, a collision-avoidance control, an automated driving controlling and the like.

In addition, while optical element driving device 1 that drives lens part 2 as the optical element is described in the present embodiment, the optical element to be driven may be an optical element other than the lens such as a mirror and a prism, or an optical element such as imaging element 502. In this case, opening 11 of holding part 10 may be changed in shape in accordance with the shape of the optical element to be attached, or may be omitted depending on the case.

In addition, while optical element driving device 1 has the AF function in the present embodiment, it may have not only the AF function, but also a function of moving lens part 2 in the Z direction such as a zoom function.

The above is a description of the embodiment of the present invention. The above description is an example of a preferred embodiment of the invention, and the scope of the invention is not limited thereto. In other words, the above description of the configuration of the device and the shape of each part is an example, and it is clear that various changes and additions to these examples are possible within the scope of the invention.

INDUSTRIAL APPLICABILITY

The optical element driving device and the camera module according to the present invention are useful when they are mounted in camera-mounted devices such as smartphones, mobile phones, digital cameras, note-type personal computers, tablet terminals, mobile game machines, in-vehicle cameras, and drones, for example.

REFERENCE SIGNS LIST

1 Optical element driving device
2 Lens part
3 Cover
4 Optical element driving device body
5 Image-capturing part
10 Holding part
11 Opening
12 Frame part
13 Outer peripheral surface
14A, 14B Magnet
15A, 15B, 15C First groove part
16 Attaching part
20 Housing part
21 Housing opening
22 Frame part
22a Bottom part
22b Side wall part
22bA, 22bB, 22bC, 22bD Corner portion
23 Inner peripheral surface
24 Outer peripheral surface
25B Insertion part
26A Recess
26B, 26C Second groove part
27 Fixed part
30A First supporting part
30B Second supporting part
30C Third supporting part
31A to 31C First rail member
32A to 32C Second rail member
33 Rolling member
34 Retainer
34a Holding hole

40B Driving part
50 Substrate part
51 FPC
51a FPC main portion
51b, 51c FPC constricted portion
51d, 51e FPC end portion
52 Driver IC
53A, 53B Inductor
54A, 54B Position detection sensor
55 Metal layer
60A, 60B Cover member
61 Lid part
63 Flange part
301 Opening
501 Image sensor substrate
502 Imaging element
503 Control part

The invention claimed is:

1. An optical element driving device comprising:
a holding part configured to hold an optical element;
a housing part configured to house the holding part such that the holding part is movable in an optical path direction of the optical element;
a driving part including a piezoelectric element configured to drive the holding part;
an inductor configured to increase an input voltage to the piezoelectric element; and
a position sensor configured to acquire a relative position of the holding part and the housing part in the optical path direction by detecting a magnetic force of a magnet,
wherein, in regions defined by dividing the holding part and the housing part into equal quarters around an optical axis, the driving part and the position sensor are disposed in a same first region, and the inductor is disposed in a second region adjacent to the first region,
along half of a periphery of the housing part formed by the first and second regions, the driving part is disposed between the position sensor and the inductor.

2. The optical element driving device according to claim 1,
wherein the housing part has a rectangular shape in plan view, and
wherein the position sensor and the inductor are disposed at respective different sides in the housing part.

3. The optical element driving device according to claim 1,
wherein the driving part includes a first driving part and a second driving part, and
wherein the first driving part and the second driving part are disposed in respective diagonally opposite regions among the regions divided into the equal quarters.

4. The optical element driving device according to claim 1, further comprising a control element configured to control the piezoelectric element through the inductor,
wherein the control element is disposed in a region different from a region in which the inductor is disposed among the regions divided into the equal quarters.

5. A camera module comprising:
the optical element driving device according to claim 1; and
an image capturing part configured to capture a subject image by using the optical element.

6. A camera-mounted device that is an information device or a transport device, the camera-mounted device comprising:

the camera module according to claim 5; and an image processing part configured to process image information obtained by the camera module.

\* \* \* \* \*